Sept. 25, 1962
B. HYMAN
3,055,480
CONVEYOR SYSTEM
Filed July 22, 1959
4 Sheets-Sheet 1
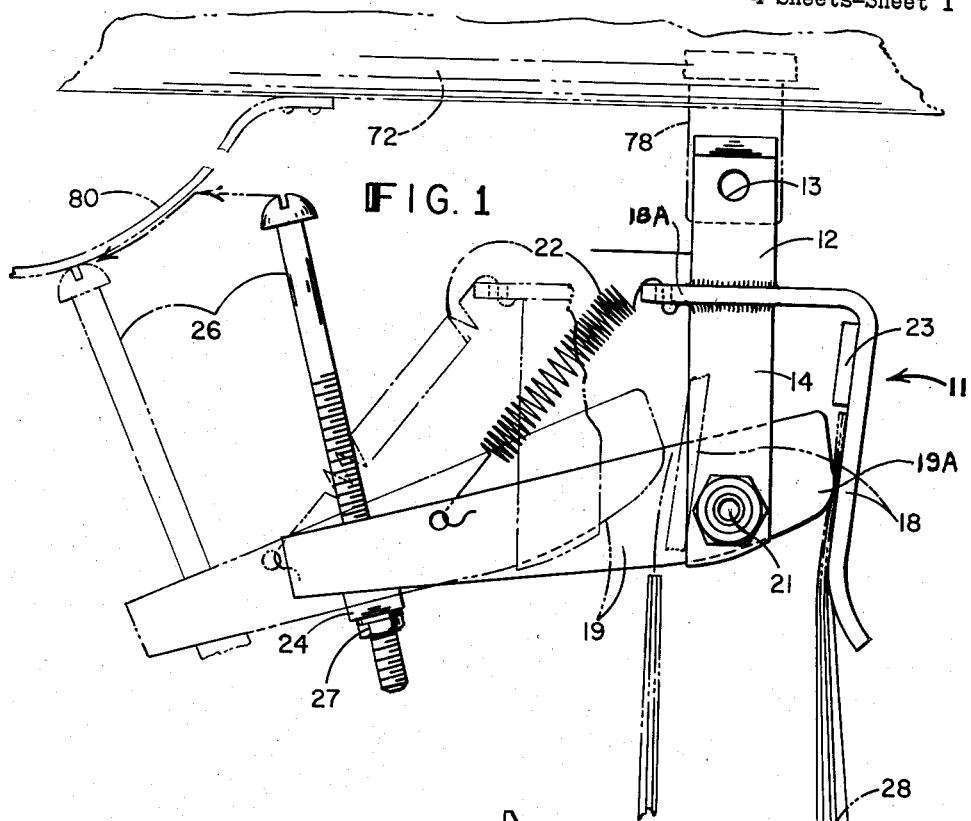
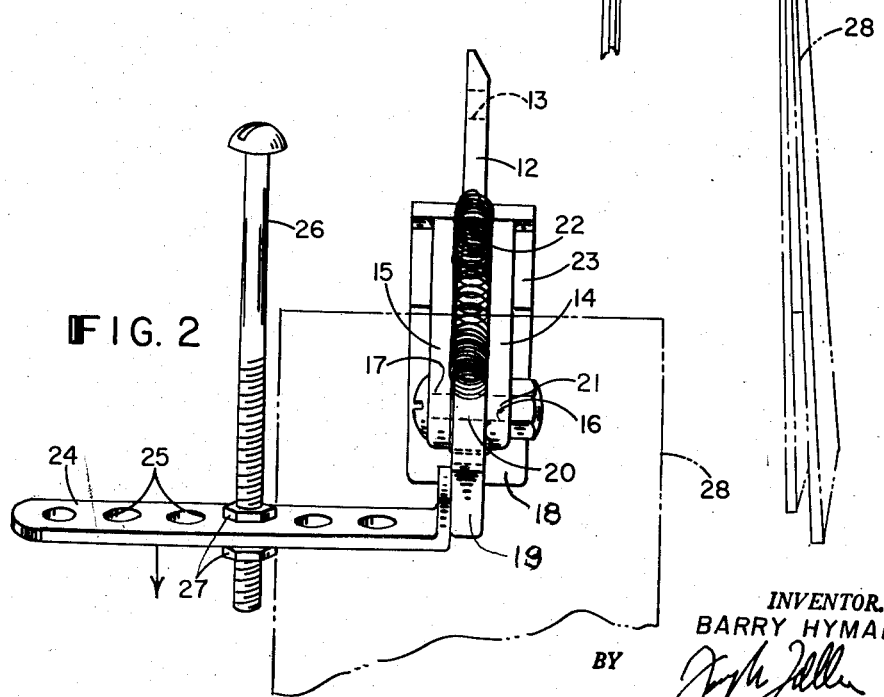
INVENTOR.
BARRY HYMAN
BY
ATTORNEY.

Sept. 25, 1962 B. HYMAN 3,055,480
CONVEYOR SYSTEM

Filed July 22, 1959 4 Sheets-Sheet 2

INVENTOR.
BARRY HYMAN
BY
ATTORNEY.

Sept. 25, 1962　　　　　　　B. HYMAN　　　　　　3,055,480
CONVEYOR SYSTEM

Filed July 22, 1959　　　　　　　　　　　　　4 Sheets-Sheet 3

INVENTOR.
BARRY HYMAN
BY
ATTORNEY.

Sept. 25, 1962  B. HYMAN  3,055,480
CONVEYOR SYSTEM
Filed July 22, 1959
4 Sheets-Sheet 4

INVENTOR.
BARRY HYMAN
BY
ATTORNEY

United States Patent Office 3,055,480
Patented Sept. 25, 1962

3,055,480
CONVEYOR SYSTEM
Barry Hyman, 210 Upland Road, Newton, Mass.
Filed July 22, 1959, Ser. No. 828,875
9 Claims. (Cl. 198—38)

This invention relates to a conveyor system for gripping, transporting and discharging papers and the like and particularly to a system wherein the objects to be carried are loaded and selectively discharged at predetermined stations. More particularly it relates to a system of this type wherein the conveyor may be routed from floor to floor or follow varying contours at one or more levels, or make specified turns depending on working conditions.

A primary object of this invention is to provide a system that is capable of positive action and which may follow any predetermined route.

A further object is to provide a system that is flexible, low in first cost, lightweight with strength, easy to install and long lived.

Another object of this invention is to provide such a system wherein operator may easily load an object manually.

Further objects and a fuller understanding of the invention will hereinafter appear from the following specification and claims and appended drawings.

The device consists of an overhead conveyor system for the selective transportation of papers and the like comprising a continuous closed conveyor line having spaced attachment members for carrying material. Positioned along the system are a number of stations, at any one of which, material may be started en route or at which it may be automatically discharged as sent from another station. The conveyor line has spaced attachment members with a plurality of work-piece clamps depending from them. Each station has a cam shaped track spaced a distance laterally from the track of the main conveyor line. Where more than two stations are used it is preferable that the lateral distance be different for each station. Each of the attachment members has connected to it a carrying clamp having a fixed jaw engageable with a pivotable, spring-load movable jaw which has a lateral projecting trigger bar having a trigger rod so positioned that it will ride over only one selected cam track and by so riding open the movable jaw and discharge any work-piece being carried. Several embodiments of this invention are described below with reference to the drawings wherein:

FIG. 1 is a side view of a carrying hanger shown in a transporting position and in a tripped position.

FIG. 2 is a front view of FIG. 1 in a transporting position.

Figure 3:
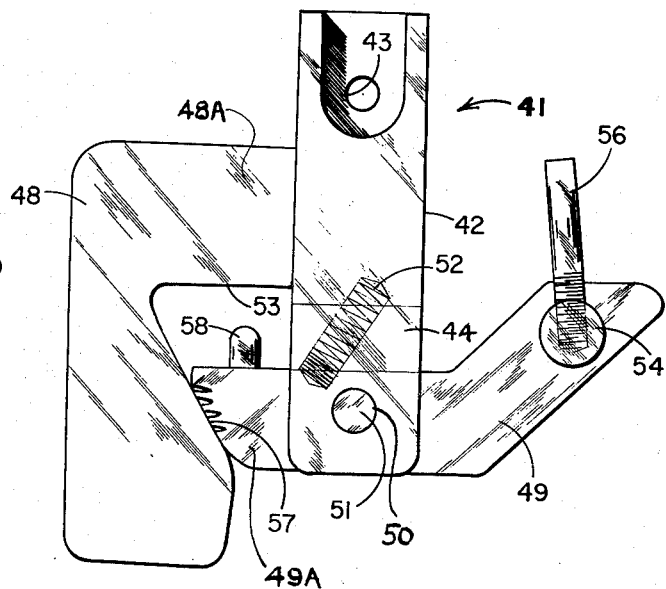
FIGURE 3 is a side view of another embodiment of the hanger.

Referring to FIGS. 1 and 2 of the drawings, the gripping clip shown as illustrative of one embodiment of the work-piece clamp portion of this invention comprises a hanger 11 having an attachment connecting portion 12 with a hole 13 spaced from the upper end to be used for attaching the hanger to a carrier pendant 78 associated with an overhead conveyor system of the roller-chain type. The lower portion of the hanger 11 is divided into two spaced plates 14 and 15 having holes 16 and 17 respectively adjacent to their lower ends. Rigidly attached to the connecting portion 12 is a depending fixed jaw 18 in the form of an inverted L, with a horizontal portion 18A and a depending leg. An arm 19 movable in a vertical plane with a clamping jaw 19A has a pivot hole 20 adjacent the clamping end. A pivot pin or bolt 21 is inserted through holes 16—20—17 and fixed in position dividing arm 19 into a long arm and a short arm. A spring 22 is positioned between the end of fixed arm 18A and the longer arm of the movable jaw 19. The fixed jaw 18 is provided with a stop 23 for positioning material within the clamp. Extending laterally from and attached to the non-clamping end of the longer arm of jaw 19 is a trigger bar 24 provided with trigger bar holes 25. Trigger rod 26 is adapted to be positioned in any one of the trigger bar holes 25 and rigidly fixed by nuts 27 or other fastening means. Material to be gripped between fixed jaw 18 and movable clamping jaw 19A is indicated as 28.

Figure 4:
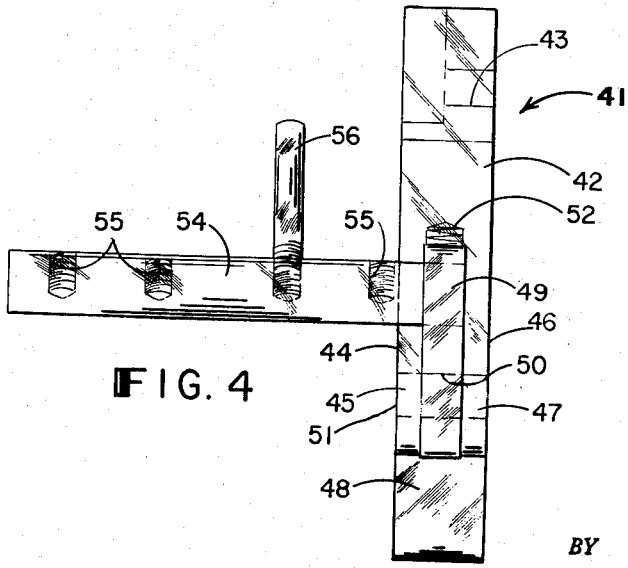
FIG. 4 is a front view of FIG. 3.

Referring to FIGS. 3 and 4, the gripping clip therein shown is another embodiment of the clamp portion of my invention and comprises a hanger 41 having a connecting portion 42 with a hole 43 spaced from its upper end, to be used for attaching the hanger to a carrier pendant 78. The lower portion of the hanger 41 is divided into two spaced legs 44 and 46 having holes 45 and 47 respectively adjacent to their lower ends. Rigidly attached to the connecting portion 42 is a depending fixed jaw 48 in the form of an inverted L with a horizontal portion 48A. A movable arm 49 with a clamping jaw 49A has a pivot hole 50 adjacent the clamping end. A pivot rod 51 is inserted through holes 45—50—47 and fixed in position. A spring 52 is inserted between the end of the horizontal portion 48A and the clamping jaw portion 49A tending to push the clamping jaw 49A away from the connecting portion.

The bottom surface 53 of the horizontal portion 48A serves as a stop for positioning material within the clamp. A trigger bar 54 extends laterally from the end of the longer section of the arm 49 and is provided with a plurality of spaced threaded holes 55 into any one of which the trigger rod 56 may be positioned. The material clamping end 57 of the jaw 49A is preferably curved and serrated. A jaw stop 58 may be used to limit the motion of the jaw 49 if required.

To change the position of trigger rod 56, so that it may be reset in order to be tripped by camming action at a particular selected station, it is unscrewed from one hole 55 and inserted into the proper hole positioned to register with the tripping track or element at the selected station.

Figure 4A:
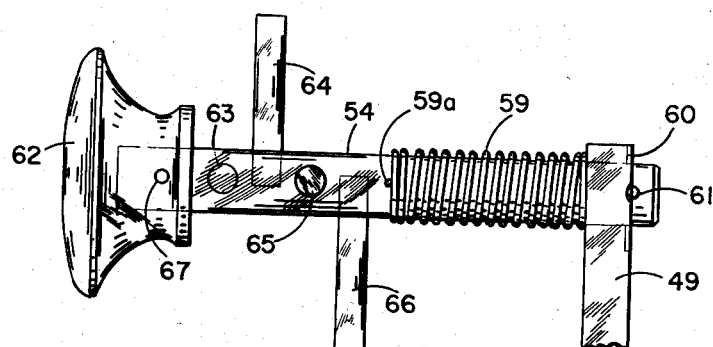
FIG. 4A is a side view of an adjustable rotatable trigger bar which may be substituted for the fixed trigger bar shown in FIG. 4.
Figure 4B:
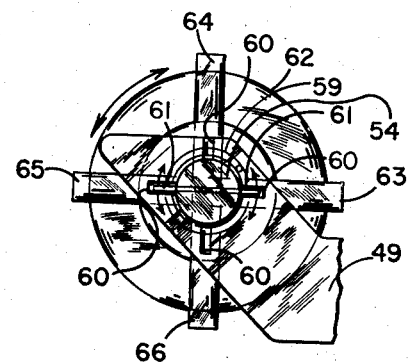
FIG. 4B is a rear view of FIG. 4A.

FIGS. 4A and 4B show a novel mechanism for rapid changing of the setting of the trigger rods from one tripping position to another. This mechanism consists of an adjustable rotatable trigger bar 54 passing through and extending laterally on both sides of the movable arm 49. Fixedly positioned on bar 54 are a plurality of trigger rods 63, 64, 65 and 66 shown here as four rods positioned at 90 degree angles to each other. There may be more or less. Positioned between the inner face of arm 49 and retaining pin 59a there is a spring 59, under compression and positioned over bar 54. One end of bar 54 is an adjusting knob 62 fastened to it by pin 67. The face of the knob may have indicia associated with the positions of the rods 63, 64, 65, and 66 showing the various triggering positions. On the outer face of arm 49, there are four grooves 60 positioned at right angles to each other and parallel to the axes or rods 63, 64, 65 and 66. Passing through the other end of bar 54 is a pin 61 positioned parallel to the axes of rods 63 and 65 and adapted to fit into opposite grooves 60.

By pushing in on knob 62, retaining spring 59 is compressed and bar 54 moves through arm 49. This disengages pin 61 from the grooves 60. Knob 62 is then turned to place any one of the rods 63, 64, 65 or 66 into the required tripping position. Spring 59 is then allowed to expand which causes pins 61 to be reseated in grooves 60 anchoring the rods into an operating position.

Figure 5:
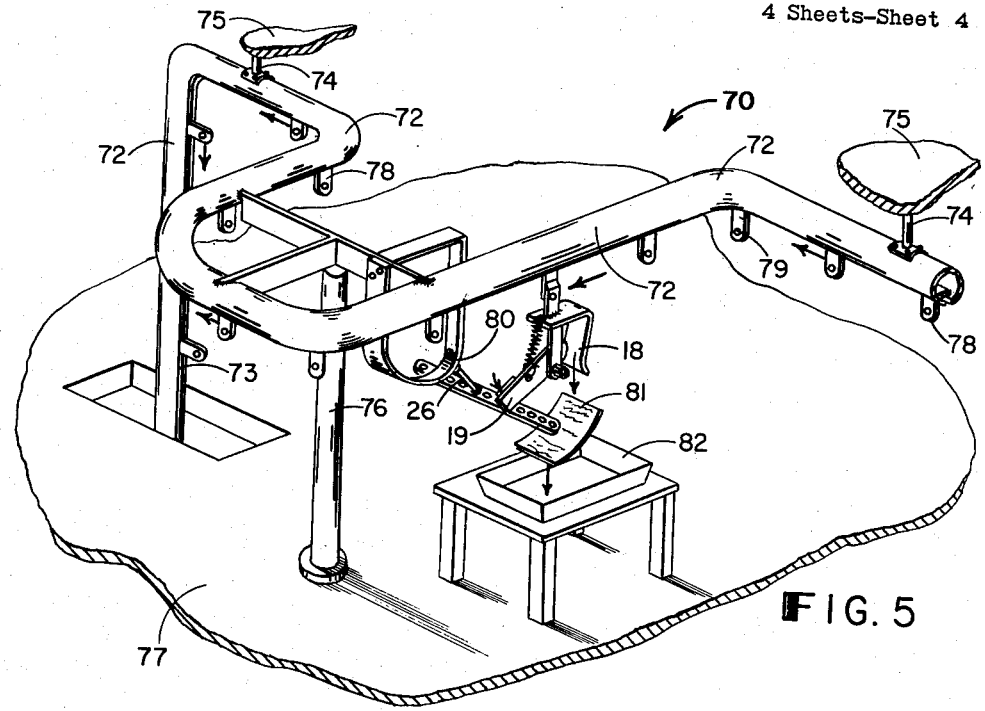
FIG. 5 is a perspective view of a portion of a system showing a station on the system using a hanger of the type shown in FIGS. 1 and 2.
Figure 6:
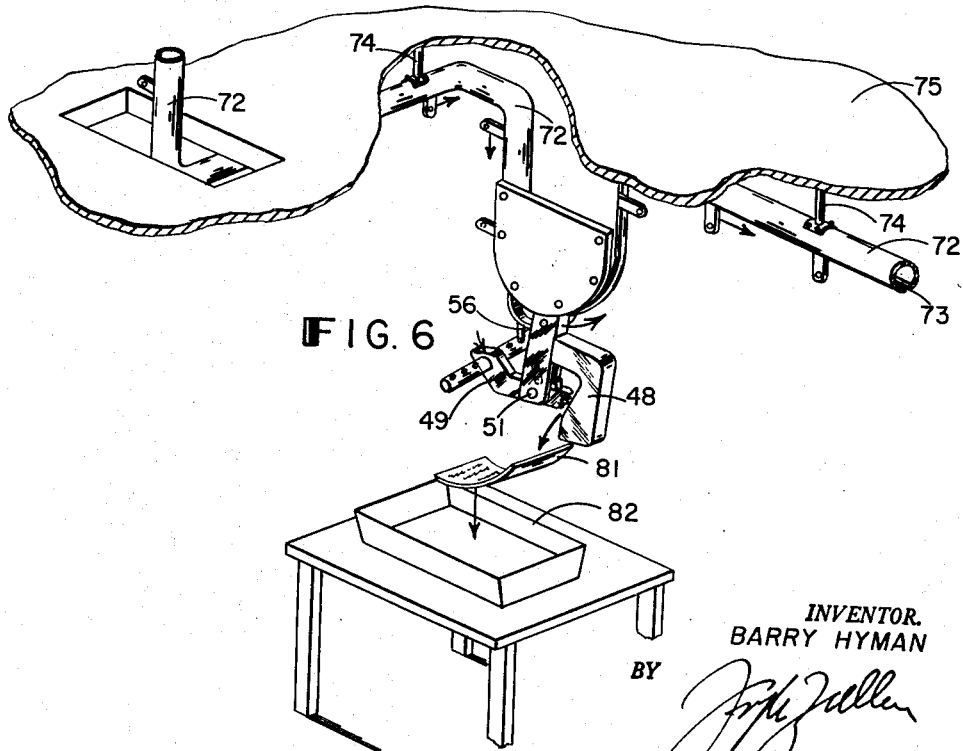
FIG. 6 is a perspective view of a portion of a system showing a station on the system using a hanger of the type shown in FIGS. 3 and 4.

FIGS. 5 and 6 show portions of a typical overhead conveyor system 70 constructed in accordance with my invention. The overhead conveyor has an endless hollow conveyor track 72 with a longitudinal slot 73 extending the length of the lower portion of the track. The track 72 is suspended by hangers 74 from the ceiling 75 or is upheld by supports 76 positioned on the floor 77.

Carrier pendants 78 are spaced from each other and have their upper ends mounted on and connected to an endless roller-mounted chain (not shown) and actuated by a power drive (not shown). The roller mounted chain is enclosed within the track 72. A well known example of such a conveyor track and roller chain system is that manufactured by Chainveyor Corp., of Los Angeles, California under the trademark "Chainveyor."

The lower end of each pendant 78 extends through the slot 73. Each pendant 78 has a hole 79 in the portion extending through the slot. The hole 13 in the connecting portion 12 and the hole 79 in the pendant 78 are provided to rigidly fasten portion 12 and pendant 78 together.

The endless track may be installed horizontally or vertically or obliquely and with vertical and horizontal connecting curved sections of varying radii, so that practically any track configuration may be obtained by connecting together the various types of track sections, the slot 73 always being continuous and on the bottom or on one side of the track 72 as in the case of vertical or oblique runs.

Referring to FIG. 5, a tripping track 80 is rigidly positioned parallel, adjacent to and below the conveyor track 72. It is spaced from track 72 the same distance that trigger rod 26 is spaced from attachment portion 12 along trigger bar 24.

In FIG. 6 the track 72 is shown dipping down towards a receiving station where the gripping clip is tripped, releasing the article 81 being carried and allowing it to fall, for example, into a receptacle 82.

In operation, we have the endless roller conveyor chain moving at predetermined speed within the enclosing track 72 with spaced pendants 78 extending through the slot 73 in the track. At selected locations along the route of the carrier there are positioned certain discharge stations where the selected articles being carried are released and fall free of the carrier.

Fixedly attached to a plurality of the pendants 78 are gripping clips having trigger fingers such as 26, so positioned at locations along the trigger bar 24 as to open the clamping jaw 19A of the clip when trigger rod 26 comes in contact with and rides over a tripping track 80 positioned selectively and specifically to register with the position of the trigger rod 26.

As the arm 19 may swing around the pivot 21, restrained only by the spring 22, the resulting opening between the fixed jaw 18 and the movable clamping jaw 19A may vary depending on the movement of the trigger rod 26 which is governed by the contour of the tripping track or cam 80, the operation of the spring 22 closing the jaws after rod 26 has passed over the tripping track.

The gripping clips are preferably so marked that their associated discharge stations are easily identified. An operator desiring to send material to any station, waits for the next associated designated gripping clip to arrive at his station at which time as the selected clip moves by his station, he slips the material 28 to be carried into the grip between fixed jaw 18 and movable jaw 19A usually without depressing arm 19. When the grip reaches the registering station, the jaws open automatically and the material is discharged. The trigger rods and tripping tracks are so designed that they may be installed with the trigger either leading the grip or trailing it as it moves along attached to the chain. In accordance with FIGS. 4A and 4B a system may be set up wherein the trigger rod may be set or reset for a designated station as it passes the operator.

While the preferred embodiments of my invention have been described in detail it will be understood that I do not wish to be limited to the particular construction set forth, since various changes in the form, material, proportions and arrangement of parts, and in the details of construction, may be resorted to without departing from the spirit and scope of the invention, or destroying any of the advantages contained in the same, heretofore described and defined in the following claims. Thus, for example instead of riding on a cam track the trigger finger can actuate an electric switch which in turn actuates a solenoid arm which depresses the movable jaw.

I claim:

1. A work-piece clamp for use with a continuous conveyor having spaced attachment members, said clamp comprising a connecting portion adapted to be rigidly connected to a said attachment member and having a pivot, a jaw movable in a vertical plane and mounted on said pivot, a fixed jaw depending from said connecting portion and adapted to engage said movable jaw, spring means connected to said movable jaw and arranged to urge the jaws into engagement, a trigger bar attached transversely to the non-clamping end of said movable jaw, and a trigger rod attached vertically to said trigger bar; the distance from said pivot to the normally engaging surface of said movable jaw being greater than the shortest distance from said pivot to the clamping surface of said fixed jaw so that the downward motion of said movable jaw is limited.

2. A work-piece clamp for use with a continuous conveyor having spaced attachment members, said clamp comprising a connecting portion adapted to be rigidly connected to a said attachment member and having a pivot, a jaw movable in a vertical plane and mounted on said pivot, a fixed jaw depending from said connecting portion and adapted to engage said movable jaw, spring means connected to said movable jaw and arranged to urge the jaws into engagement; a rotatably adjustable trigger bar projecting laterally from said movable jaw, and a plurality of trigger fingers perpendicularly positioned on said bar at varying angles to the longitudinal axis of said bar; the manual rotation of said bar being adapted to position any one of said fingers in an upward vertical position; the distance from said pivot to the normally engaging surface of said movable jaw being greater than the shortest distance from said pivot to the clamping surface of said fixed jaw so that the downward motion of said movable jaw is limited.

3. A gripping clip adapted for use in an overhead conveyor system of the roller-chain type provided with carrier pendants, said clip comprising a depending hanger adapted for rigid attachment on its upper end to one of said pendants and having a pivot on its lower end, a jaw movable in a vertical plane attached to said pivot and having a long arm and a short arm, a stationary inverted L shaped clamping jaw rigidly attached to said hanger, the depending leg of said clamping jaw being positioned adjacent to the end of said short arm, a spring means positioned between said movable jaw and said hanger to hold said short arm against the depending leg of said clamping jaw, a trigger supporting member extending laterally from said long arm, and a trigger finger extending upwardly from said supporting member; the distance from said pivot to the normally engaging surface of said short arm being greater than the shortest distance from said pivot to the clamping surface of said depending leg so that the downward motion of the movable jaw is limited.

4. A clamp for use with a continuous conveyor comprising a connecting portion, a pair of spaced vertical plates extending downward from said connecting portion, a lateral pivot rod positioned between the plates, a movable jaw pivoting in a vertical plane on said rod, a fixed jaw depending from said connecting portion and cooperable with the forward section of said movable jaw, a spring positioned between the rearward section of said connecting portion and said movable jaw and tending to push said jaws into engagement, a trigger bar laterally and perpendicularly attached to the forward section of said movable jaw and a trigger rod extending vertically from said trigger bar; the distance from said pivot rod to the normally engaging surface of said movable jaw being greater than the shortest distance from said pivot rod to the clamping surface of said fixed jaw so that the downward motion of said movable jaw is limited.

5. A conveyor system for selective transportion of papers and the like, comprising a continuous closed conveyor line having spaced attachment members, a plurality of work-piece clamps fixedly attached to said attachment members, a plurality of tripping stations each having a cam shaped track spaced at a different distance laterally from said conveyor line, each of said clamps having a fixed jaw, a pivot, a jaw mounted on said pivot and movable in a vertical plane and spring means connected to said movable jaw and arranged to urge the jaws into engagement; the distance from said pivot to the normally engaging surface of said movable jaw being greater than the shortest distance from said pivot to the clamping surface of said fixed jaw so that the downward motion of the movable jaw is limited, each said movable jaw having a laterally projecting trigger bar and a trigger rod vertically positioned on said bar, each clamp having its trigger rod so positioned as to engage only one of said cam tracks, the engagement of a said rod and cam track serving to open said clamp jaw and discharge any carried work-piece.

6. A conveyor system for selective transportation of papers and the like, comprising a continuous closed conveyor line having spaced attachment members, a plurality of work-piece clamps fixedly attached to said attachment members, a plurality of tripping stations each having a cam shaped track spaced at a different distance laterally from said conveyor line, each of said clamps having a fixed jaw, a pivot, a jaw mounted on said pivot and movable in a vertical plane and spring means connected to said movable jaw and arranged to urge the jaws into engagement; the distance from said pivot to the normally engaging surface of said movable jaw being greater than the shortest distance from said pivot to the clamping surface of said fixed jaw so that the downward motion of said movable jaw is limited, each said movable jaw having a laterally projecting, adjustable rotatable trigger bar provided with a plurality of trigger fingers perpendicularly positioned on said bar and at varying angles to the longitudinal axis of said bar, the manual rotation of said bar being adapted to position any one of said fingers to register with a particular track at one of said tripping stations.

7. A conveyor system for transporting and selectively discharging papers and the like, comprising a continuous endless hollow conveyor track having an endless longitudinal slot extending the length of said track, spaced curved tripping tracks positioned at various selected locations and at varying distances from said conveyor track, a power driven endless conveyor chain positioned within said conveyor track, spaced carrier pendants connected to said chain and extending through said slot, spring loaded clamps depending from said pendants, each of said clamps having a fixed jaw, a pivot, a jaw mounted on said pivot and movable in a vertical plane and spring means connected to said movable jaw and arranged to urge the jaws into engagement, said movable jaw being provided with a trigger finger vertically positioned on a laterally projecting trigger bar, said finger being positioned and adapted to ride over the registering position of said tripping track, the amount of opening between said jaws being governed by the contour of said tripping track, the distance from said pivot to the normally engaging surface of said movable jaw being greater than the shortest distance from said pivot to the clamping surface of said fixed jaw so that the downward motion of said movable jaw is limited.

8. A conveyor system for transporting and selectively discharging papers and the like, comprising a continuous closed conveyor line having spaced attachment members, a plurality of work-piece clamps fixedly attached to said attachment members, a plurality of tripping stations each having a cam-shaped track spaced laterally from said conveyor line, each of said clamps having a fixed jaw, a pivot, a jaw mounted on said pivot and movable in a vertically plane and spring means connected to said movable jaw and arranged to urge the jaws into engagement; the distance from said pivot to the normally engaging surface of said movable jaw being greater than the shortest distance from said pivot to the clamping surface of said fixed jaw so that the downward motion of the movable jaw is limited, each said movable jaw having a laterally projecting trigger bar and a trigger rod vertically positioned on said bar, said rod being engageable with said track so as to open said clamp jaw and discharge any carried work piece.

9. A work-piece clamp comprising a portion adaptable for fixed attachment to a conveyor line, a fixed jaw, a pivot, a jaw mounted on said pivot and movable in a vertical plane and spring means connected to said movable jaw and arranged to urge the jaws into engagement; the distance from said pivot to the normally engaging surface of said movable jaw being greater than the shortest distance from said pivot to the clamping surface of said fixed jaw so that the downward motion of said movable jaw is limited, a trigger bar projecting laterally from said movable jaw and a trigger finger extending perpendicularly to said trigger bar.

References Cited in the file of this patent

UNITED STATES PATENTS

| | | |
|---|---|---|
| 1,167,730 | Wagner | Jan. 11, 1916 |
| 1,247,535 | Huddleston | Nov. 20, 1917 |
| 1,781,655 | Cowley | Nov. 11, 1930 |
| 2,804,965 | Anderson | Sept. 3, 1957 |